United States Patent
Panis et al.

(10) Patent No.: US 7,123,629 B1
(45) Date of Patent: Oct. 17, 2006

(54) BROADBAND NETWORK ACCESS DEVICE FOR VOICE DATA TRANSMISSION

(75) Inventors: Christian Panis, Vienna (AT); Christian Schranz, Villach (AT); Herbert Zojer, Villach (AT); Manfred Preitnegger, Klagenflurt (AT)

(73) Assignee: Infineon Technologies AG, Munich (DE)

(*) Notice: Subject to any disclaimer, the term of this patent is extended or adjusted under 35 U.S.C. 154(b) by 852 days.

(21) Appl. No.: 10/031,058

(22) PCT Filed: Jul. 13, 2000

(86) PCT No.: PCT/DE00/02296

§ 371 (c)(1),
(2), (4) Date: Jun. 11, 2002

(87) PCT Pub. No.: WO01/06719

PCT Pub. Date: Jan. 25, 2001

(30) Foreign Application Priority Data

Jul. 15, 1999 (DE) ................. 199 33 264

(51) Int. Cl.
*H04J 3/06* (2006.01)
(52) U.S. Cl. ................. 370/503; 375/222; 375/354
(58) Field of Classification Search ................. 370/352, 370/503, 516, 518; 375/222, 226, 229, 240, 375/294, 240.28, 354, 355
See application file for complete search history.

(56) References Cited

U.S. PATENT DOCUMENTS

| | | | | |
|---|---|---|---|---|
| 5,623,491 | A * | 4/1997 | Skoog ................. | 370/397 |
| 5,757,801 | A * | 5/1998 | Arimilli ................. | 370/444 |
| 6,483,902 | B1* | 11/2002 | Stewart et al. ........... | 379/90.01 |
| 6,735,302 | B1* | 5/2004 | Caine et al. ................. | 379/405 |
| 2002/0027900 | A1* | 3/2002 | Hjartarson et al. ......... | 370/352 |
| 2002/0191635 | A1* | 12/2002 | Chow et al. ................. | 370/463 |
| 2003/0043807 | A1* | 3/2003 | Jones et al. .............. | 370/395.1 |

FOREIGN PATENT DOCUMENTS

EP        0928123 A2      7/1999

* cited by examiner

*Primary Examiner*—Andy Lee
*Assistant Examiner*—Gopa Bhattacharjee
(74) *Attorney, Agent, or Firm*—Maginot, Moore & Beck

(57) ABSTRACT

In the broadband network access device for transmitting narrowband, low-frequency voice signals and broadband, higher-frequency data signals, the voice data is sampled in the data clock pattern and subsequently decimated. The transmission of the data which has already been decimated to the voice clock to the voice DSP (DSP) is still carried out in the data clock pattern. The conversion to the voice clock pattern is carried out in a synchronization interface (SM), directly upstream of the voice DSP. The same applies correspondingly in the opposite direction of transmission. The invention is used in xDSL methods, for example ADSL-.Lite.

5 Claims, 2 Drawing Sheets

BROADBAND NETWORK ACCESS DEVICE FOR VOICE DATA TRANSMISSION

Figure 1:
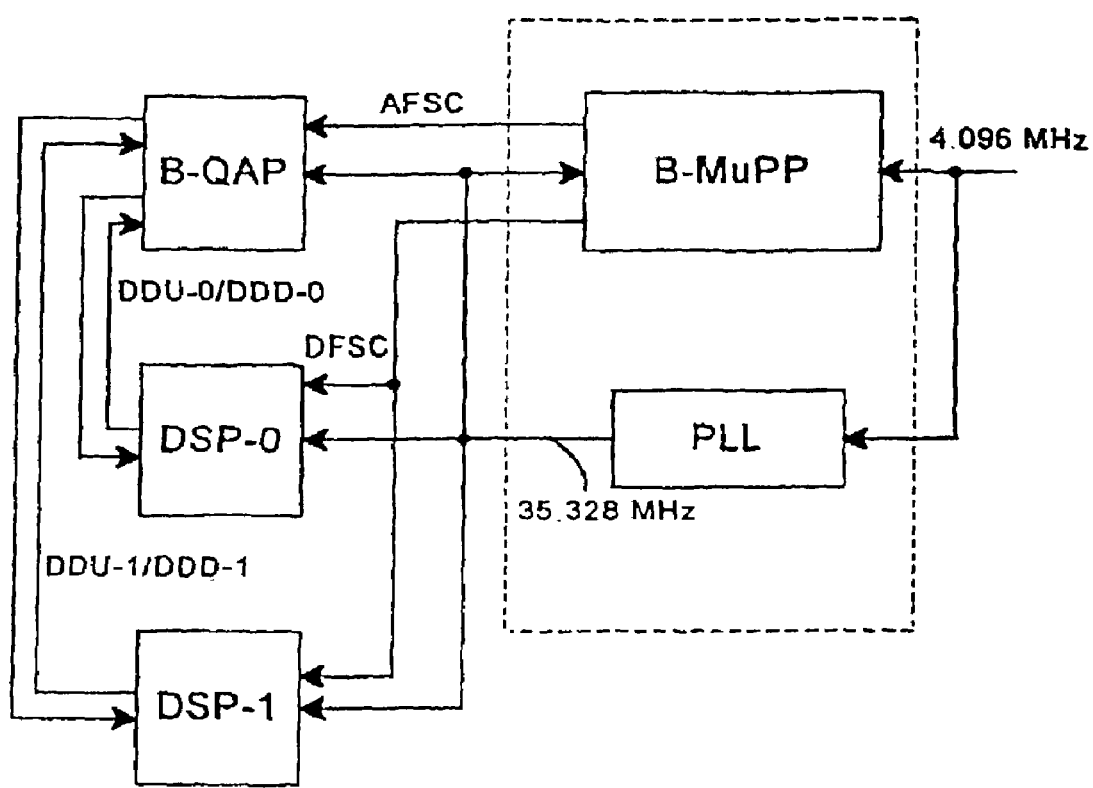

The invention relates to a broadband network access device for the transmission of voice and data, having one or more broadband subscriber line interface circuits, parallel with one another, for connecting to analog telephone subscriber lines, having a device which splits narrowband, low-frequency voice signals and broadband, higher-frequency data signals in both directions of transmission and which also converts the voice and data signals into the digital form in the direction of the network by sampling and into the analog form in the opposite direction, and having a digital signal processor which is provided for processing the voice signal data and which is connected to a digital voice network, and a digital signal processor which is provided for processing the data signal data and is connected to a digital data network.

The transmission of voice via an analog subscriber line in a telephone network is carried out in analog form. It is done using a frequency band, what is referred to as the voice band, which constitutes only a relatively narrow frequency band of the entire transmission bandwidth of a copper double conductor (POTS=Plain Old Telephone System). In what are referred to as xDSL (x-Digital Subscriber Line) transmission methods, the frequency ranges above the voice band are also used for data transmission in a broadband fashion in a telephone network. xDSL transmission methods include HDSL (High Bit Rate Digital Subscriber Line), ADSL (Asymmetric Digital Subscriber Line) and VDSL (Very High Speed Digital Subscriber Line). The xDSL transmission methods are referred to as broadband network access technology and comprise all the transmission methods via the telephone network which make possible a higher data transmission rate between a subscriber and the central office (CO) than the data transmission rate which can be achieved with voice band modems. To do this, in the xDSL transmission methods, what is referred to as an xDSL data signal, which designates a digital signal which is encoded for the xDSL transmission method, is transmitted in a higher frequency band, the data band, which is separated from the voice band. The xDSL transmission methods can theoretically use the entire bandwidth of the copper double conductor available above the voice band and achieve data transmission rates in the Mbit/s range.

When designing a broadband network access device for such a voice signal/data signal transmission method it is to be noted that the clock pattern which is customary for the transmission of voice is normally based on multiples of the voice bandwidth of 4 kHz, which gives rise to a data clock base of 8 kHz. The latter is not suitable for the transmission of data because in the DMT method used here the sampling rate is obtained as a multiple of the distance between two subcarriers of 4.3125 kHz, which is referred to below as the data clock base.

The invention is based on the object of constructing and operating a common broadband network access device for the transmission of voice and data in such a way that the sampling rates and clock systems which are predefined for the data transmission range and the voice transmission range are combined in a fully operationally capable fashion.

According to the invention, which relates to a broadband network access device for the transmission of voice and data of the type mentioned at the beginning, this object is achieved in that the voice signals are sampled in the direction of transmission to the voice network with a multiple of the data clock base and are subsequently decimated, in that the data which has already been decimated to the voice clock is still transmitted in the data clock pattern to the digital signal processor provided for processing the voice signals, in that the conversion to the voice data pattern is carried out in a synchronization interface module directly upstream of the digital signal processor which is provided for processing the voice data, and in that the sampling in the opposite direction of transmission takes place in a functionally corresponding fashion. The specified measures successfully combine the two different sampling rates or clock systems, the user very easily obtaining synchronization between his data path and his voice path and a complex, external synchronization process thus being avoided.

The synchronization interface module is expediently combined at the module level with the actual digital signal processor which is provided for processing the voice data.

In the broadband network access device according to the invention, the synchronization interface module is expediently embodied as a device for performing soft synchronization between the data clock pattern and the voice data pattern.

The broadband network access device according to the invention can advantageously be used for implementing an xDSL (x-Digital Subscriber Line) system, for example an ADSL (Asymmetric Digital Subscriber Line) system.

The broadband network access device according to the invention is particularly expediently embodied using integrated circuit technology. With such technology, inter alia, the device which splits the voice and data signals in both directions of transmission and which also converts the voice and data signals in the digital form in the direction of the network by sampling and into the analog form in the opposite direction, the digital signal processor which processes the digital voice signals, the digital signal processor which processes the digital data signals and a phase locked loop PLL which is provided for generating the clock and has a quartz-stabilized, controlled oscillator can each be formed by a separate integrated circuit module in one chip set, in which case the digital signal processors can be composed, depending on the size requirements, of a plurality of subunits which can each be integrated at the module level. The phase locked loop PLL which is provided for generating the clock and is equipped with a quartz-stabilized, controlled oscillator can be combined here with the digital signal processor which processes the digital voice signals, in a single integrated circuit module.

Figure 2:
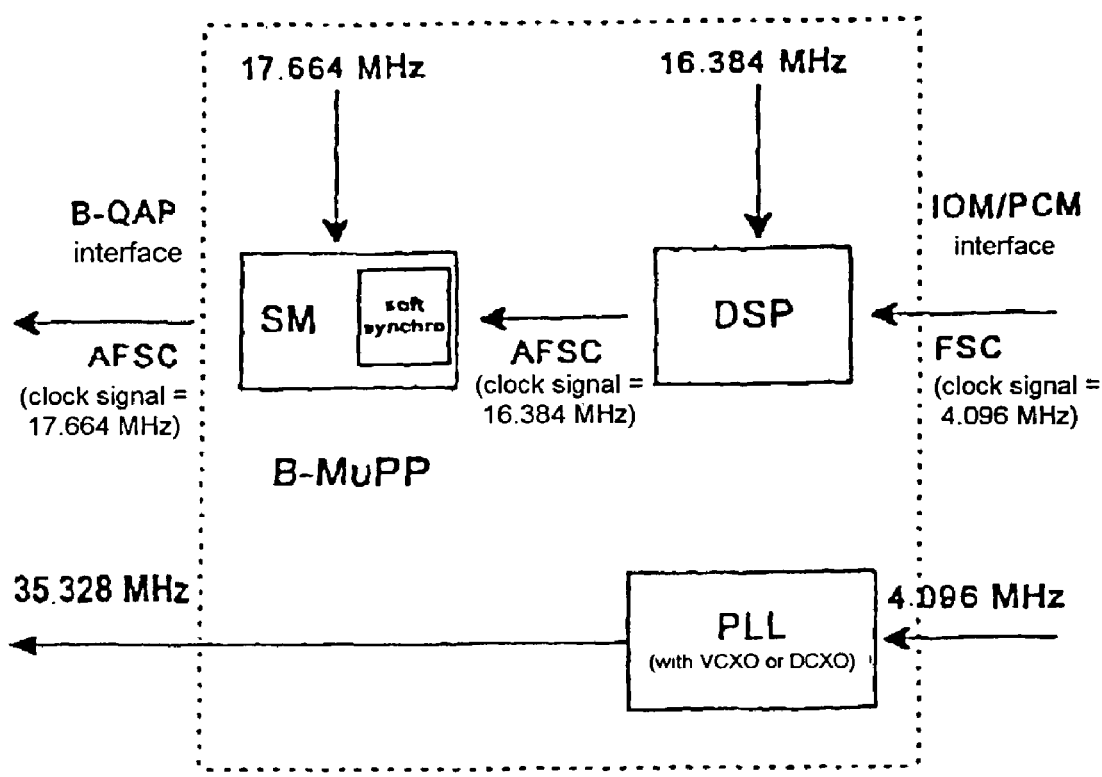

The invention is explained below with reference to block circuit diagrams which are represented in two figures, of which:

FIG. 1 shows a block circuit diagram of that part of a broadband network access device according to the invention which is responsible for the combination of the different sampling rates, and FIG. 2 shows a detailed excerpt from the block circuit diagram in FIG. 1.

Subscriber line interface circuits (not illustrated in FIG. 1) which are assigned to analog bidirectional telephone subscriber lines and via which analog voice and data signals are transmitted in both directions of transmission are provided within the scope of an ADSL (Asymmetric Digital Subscriber Line) system. These subscriber line interface circuits are connected in a bidirectionally effective fashion to a device B-QAP (Broadband-Quad Analog POTS), which splits the narrowband, low-frequency voice signals and the broadband, higher-frequency data signals in both directions of transmission and, integrated in this way, converts the voice and data signals into digital signals in the one direction of transmission and into analog signals in the opposite direction of transmission.

The digitized and decimated voice signal is then fed to a digital signal processor B-MUPP (Broadband Multichannel Processor for POTS) for processing voice signals, while the digitized data signal is fed via data lines DDU-0 (DDU=Digital Data Upstream) and DDU-1 to two digital signal processors DSP-0 and DSP-1 which are configured, through cooperation, as a data pump for processing digital signals. The voice data which is processed in the digital signal processor B-MUPP is then input, for example in PCM form, into a correspondingly configured, digital voice network.

In a similar way, the data signals which are processed in the two digital signal processors DSP-0 and DSP-1 are then fed, for example as ATM signals, into a correspondingly configured, digital data network. The digital voice network and the digital data network connect corresponding central offices to one another. In the opposite direction of transmission, the digital signal processor B-MuPP and the two digital signal processors DSP-0 and DSP-1 receive a digital voice signal and a digital data signal from the digital voice network and from the digital data network, respectively.

The digital voice signal which is received from the digital voice network is fed to the device B-QAP by the digital voice signal processor B-MuPP. The digital data signal which is received from the digital data network is fed by the digital data signal processor DSP-0 and DSP-1, via the data lines DDD-0 and DDD-1 (DDD=Digital Data Downstream), to the device B-QAP which converts all the digital signals in this direction of transmission into analog signals and in which the narrowband, low-frequency voice signal and the broadband, higher-frequency data signal are also combined to form an analog composite signal, which is fed to the subscribers via the subscriber line interface circuits and the subscriber lines.

The connection to the voice network is established via an IOM/PCM interface IOM/PCM. At said voice network, the sampling frequency is 4.096 MHz. Using a phase locked loop PLL which is equipped with a quartz-stabilized oscillator VCXO or DCXO and which is supplied with the sampling frequency of 4.096 MHz of the IOM/PCM voice network, a frequency of 35.328 MHz is generated, which is a multiple (8192 times) of the data clock base of 4.3125 kHz on which the data sampling is based according to standard practice.

The device B-QAP, the digital signal processor B-MuPP which is responsible for voice and the two digital signal processors DSP-0 and DSP-1 which are responsible for the data are supplied with this frequency of 35.328 MHz. Between the device B-QAP and the two digital signal processors DSP-0 and DSP-1 there are dedicated data interfaces via the data lines DDU-0/DDD-0 and DDU-1/DDD-1.

The synchronization of the two digital signal processors DSP-0 and DSP-1 for the processing and transmission of the digital data signals is carried out via the line DFSC (Data Frame Synchronization). Control information is also necessary for the sequence control of the sampling in the device B-QAP. For this purpose, an interface is defined between the sampling device B-QAP and the digital signal processor B-MuPP which is responsible for the voice signal processing.

This interface, which is also contained in the circuit module which contains the actual digital signal processor B-MuPP, is used both for transmitting control and check data (AFSC=Analog Frame Synchronization) and the voice signal itself. As FIG. 2 shows, the voice data is sampled in the device B-QAP with 17.664 MHz, that is to say with a multiple (4096 times) of the data clock base of 4.3125 kHz and subsequently decimated.

The transmission of the voice data, already decimated to the voice clock, to the digital voice signal processor B-MuPP is still carried out in the data clock pattern, that is to say at 17.664 MHz. The conversion to the voice pattern of 16.384 MHz, on which the voice basic sampling frequency of 8 kHz is based and which is a multiple (2048 times) of this voice basic sampling frequency, takes place in an interface in an interface module SM, which is located in the voice signal processor module B-MuPP, connected directly upstream of the actual digital voice signal processor DSP. The synchronization interface module SM is embodied as a device for soft synchronization (soft synchro) between the data clock pattern and the voice data pattern. The sampling in the opposite direction of transmission is carried out in a functionally corresponding fashion.

The broadband network access device illustrated in FIGS. 1 and 2 is embodied using integrated circuit technology, specifically in one chip set. This chip set contains, inter alia, the device B-QAP which splits the voice and data signals in both directions of transmission and in which, however, the voice and data signals are also converted into the digital form in the direction of the network by sampling, and in the opposite direction into the analog form.

Furthermore, the chip set includes the digital signal processor B-MuPP which processes the digital voice signals, including the interface module SM, the digital signal processors DSP-0, DSP-1 which process the digital data signals and the phase locked loop PLL which is provided for generating the clock and has a quartz-stabilized, controlled oscillator, each of these in the form of integrated circuit modules.

In the embodiment of a broadband network access device described with reference to FIGS. 1 and 2, the user very easily obtains synchronization between his data path and his signal path, and a complex, external synchronization process is avoided.

The invention claimed is:

1. A broadband network access device for the transmission of voice and data, comprising:

one or more broadband subscriber line interface circuits, parallel with one another, for connecting to analog telephone subscriber lines;

a splitting device which splits narrowband, low-frequency voice signals and broadband, higher-frequency data signals from one another in both directions of transmission and converts the voice and data signals into a digital signal in the direction of transmission to a network by sampling, and in the opposite direction of transmission into an analog signal;

a digital voice signal processor for processing the voice signal data, which is connected to a digital voice network;

a digital data signal processor for processing the data signal data, which is connected to a digital data network;

wherein the voice signals are sampled in the splitting device in the direction of transmission to the digital voice network with a multiple of a data clock base, and subsequently decimated, and the data, decimated to the voice clock, is transmitted to the digital voice signal processor in a data clock pattern which is multiple of the data clock base; and wherein the conversion to a voice data pattern, which is a multiple of a voice clock base, is carried out in a synchronization interface module upstream of the digital voice signal processor which is provided for processing the voice data; and a phase locked loop that is supplied with a multiple of the voice clock base and generates a signal with a frequency that is a multiple of the data clock base on which the data sampling is based.

2. The broadband network access device of claim 1, wherein the synchronization module is combined at the module level with the digital voice signal processor that is provided for processing the voice data.

3. The broadband network access device of claim 1, wherein the synchronization interface module is embodied as a device for performing soft synchronization between the data clock pattern and the voice data pattern.

4. The broadband network access device of claim 1, wherein the data clock base is 4.3125 kHz and the voice clock base is 8 kHz.

5. The broadband network access device of claim 1, wherein the broadband network access device is used for implementing a xDSL (x-Digital Subscriber Line) system.

* * * * *